US012162304B1

(12) United States Patent
Monge Pastor

(10) Patent No.: US 12,162,304 B1
(45) Date of Patent: Dec. 10, 2024

(54) WRITING IMPLEMENT HOLDER

(71) Applicant: Samuel E. Monge Pastor, Bensalem, PA (US)

(72) Inventor: Samuel E. Monge Pastor, Bensalem, PA (US)

( * ) Notice: Subject to any disclaimer, the term of this patent is extended or adjusted under 35 U.S.C. 154(b) by 0 days.

(21) Appl. No.: 18/226,377

(22) Filed: Jul. 26, 2023

(51) Int. Cl.
*B43K 23/004* (2006.01)
*B43L 15/00* (2006.01)

(52) U.S. Cl.
CPC ............. *B43K 23/004* (2013.01); *B43L 15/00* (2013.01)

(58) Field of Classification Search
CPC .... B43K 23/004; B43K 23/00; B43K 23/001; B43K 23/002; B43K 23/008; B43K 23/012; B43K 23/016; B43L 15/00
USPC .......................................................... 401/6–8
See application file for complete search history.

(56) References Cited

U.S. PATENT DOCUMENTS

| | | | | |
|---|---|---|---|---|
| 361,535 | A * | 4/1887 | Merrick | 401/6 |
| 5,391,010 | A | 2/1995 | Gorbunov | |
| 5,405,206 | A * | 4/1995 | Bedol | B43K 23/012 401/7 |
| 5,662,423 | A | 9/1997 | Walden | |
| 5,944,433 | A | 8/1999 | O'Mara et al. | |
| 6,315,476 | B2 | 11/2001 | Nakagawa | |
| 6,910,821 | B1 | 6/2005 | Smith | |
| 7,722,271 | B1 * | 5/2010 | Harvin | B43K 8/00 401/6 |
| 10,286,723 | B1 | 5/2019 | De Salvo | |
| 2001/0053306 | A1 * | 12/2001 | Schneider | B43K 23/012 401/258 |

OTHER PUBLICATIONS

Thumb Finger Fix Kids Writing Corrector Silicone Pen Grips. Product Listing [online]. © Lohas Silicone Rubber Co. Ltd [retrieved on Oct. 7, 2022]. Retrieved from the Internet: <URL: http://www.beaut-lohas.com/other-silicone-accessories/thumb-finger-fix-kids-writing-corrector.html>.
Brause Dip Pen Nib—29 Index Finger. Product Listing [online]. © 2005-2023 JetPens.com [retrieved on Oct. 7, 2022]. Retrieved from the Internet: <URL: https://www.jetpens.com/Brause-Dip-Pen-Nib-29-Index-Finger/pd/11798>.
Index Pen Green—Arthritis Parkinson writing ald. Product Listing [online]. Copyright, 2018 [retrieved on Oct. 7, 2022]. Retrieved from the Internet: <URL: https://indexpen.store/product/index-pen-green/>.

* cited by examiner

*Primary Examiner* — David J Walczak
(74) *Attorney, Agent, or Firm* — Cramer Patent & Design PLLC; Aaron R. Cramer

(57) ABSTRACT

The writing implement holder may be a device that is adapted to hold a writing implement on a user's finger such that movement of the user's finger may move a tip of the writing implement against a surface. As non-limiting examples, the writing implement holder may be adapted to be worn on an index finger, the writing implement may be a pen, a pencil, a marker, or a stylus, and the surface may be a sheet of paper, a tablet computer, or a smartphone. The writing implement holder may hold the writing implement to compensate for a lack of dexterity after an injury or illness, to avoid direct contact with the surface, or both. As non-limiting examples, injuries and illnesses that may reduce dexterity may include a heart attack, a stroke, arthritis, multiple sclerosis, or any combination thereof.

17 Claims, 6 Drawing Sheets

WRITING IMPLEMENT HOLDER

RELATED APPLICATIONS

None.

FIELD OF THE DEVICE

The present device relates generally to a writing implement holder and more specifically to a writing implement holder that is capable of permitting a user to write using one finger.

BACKGROUND OF THE DEVICE

People who have physical limitations, such as the elderly, those who are disabled, or those who are recovering from accidents or surgery are all too familiar with the challenges that they face when attempting to carry out activities that the majority of us undertake without much thought or difficulty. Things that are simple for people who do not have physical limitations, such as ascending stairs or bending down to tie one's shoes, can be extremely taxing on the body for people with physical limitations, or they may even be impossible to complete without the assistance of another person.

Among all of these challenges, one of the most difficult things to do is to write, which is especially challenging for people who have had a stroke or a heart attack in the past. The capacity to even grip the writing instrument and place one's thumbs and fingers around the instrument can be difficult for certain people. This can be a difficult challenge to overcome. This issue occurs not just with pens and pencils but also with electronic styluses and paintbrushes as well. As a result, there is a demand for a technique that can give those who are unable to grasp a writing instrument in the traditional manner the capacity to do so with only one finger. This can be accomplished using a combination of techniques. This requirement was satisfied with the creation of the writing implement holder.

SUMMARY OF THE DEVICE

Embodiments of the present disclosure may include a writing implement holder including a bent armature. Embodiments may also include a fingertip sleeve secured upon an inside face of the bent armature. Embodiments may also include a finger retainer secured upon the inside face of the bent armature adjacent a bent armature first end. Embodiments may also include one or more implement retainers.

In some embodiments, the bent armature may include an upper arm and a lower arm meeting at an oblique angle appropriate for writing or drawing. In some embodiments, the angle formed by the upper arm and the lower arm may be thirty-eight degrees with an error of five degrees. In some embodiments, the angle formed by the upper arm and the lower arm may be adjustable.

In some embodiments, the upper arm of the bent armature may include a trough on an exterior face of the upper arm of the bent armature for holding the writing implement and preventing it from rolling off. In some embodiments, the lower arm of the bent armature has a concave curvature conforming to the bottom of the user's finger.

In some embodiments, the fingertip sleeve may be hollow and has an elliptical nosecone shape. In some embodiments, the fingertip sleeve may include a solid bottom half and a top half with a plurality of tabs for bending over the user's finger. In some embodiments, the finger retainer may include an elongate strap with a capturing element for detachably coupling to the user's finger.

In some embodiments, the finger retainer may be adjustable along the length of the lower arm. In some embodiments, the fastening means for retaining the strap on the user's finger may include a slotted tab or a hook-and-loop fastener. In some embodiments, the implement retainers encircle the writing implement and the upper arm of the bent armature.

In some embodiments, the implement retainers may be nylon cable ties or hook-and-loop cable ties. In some embodiments, the length of the upper arm may be five inches with an error of one-half inch. In some embodiments, the length of the lower arm may be two and one-half inches with an error of one-half inch. In some embodiments, the writing implement holder may include an extension attached to or integral with the lower arm.

In some embodiments, the extension may be partially or fully flexible. In some embodiments, the writing implement holder may include an extension strap with a capturing element for detachably coupling to the user's finger at a different location. In some embodiments, the fastening means for retaining the extension strap on the user's finger may include an extension slotted tab or a hook-and-loop fastener. In some embodiments, the writing implement holder, adapted for use by individuals with reduced dexterity due to injuries or illnesses such as a heart attack, a stroke, arthritis, multiple sclerosis, or any combination thereof.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
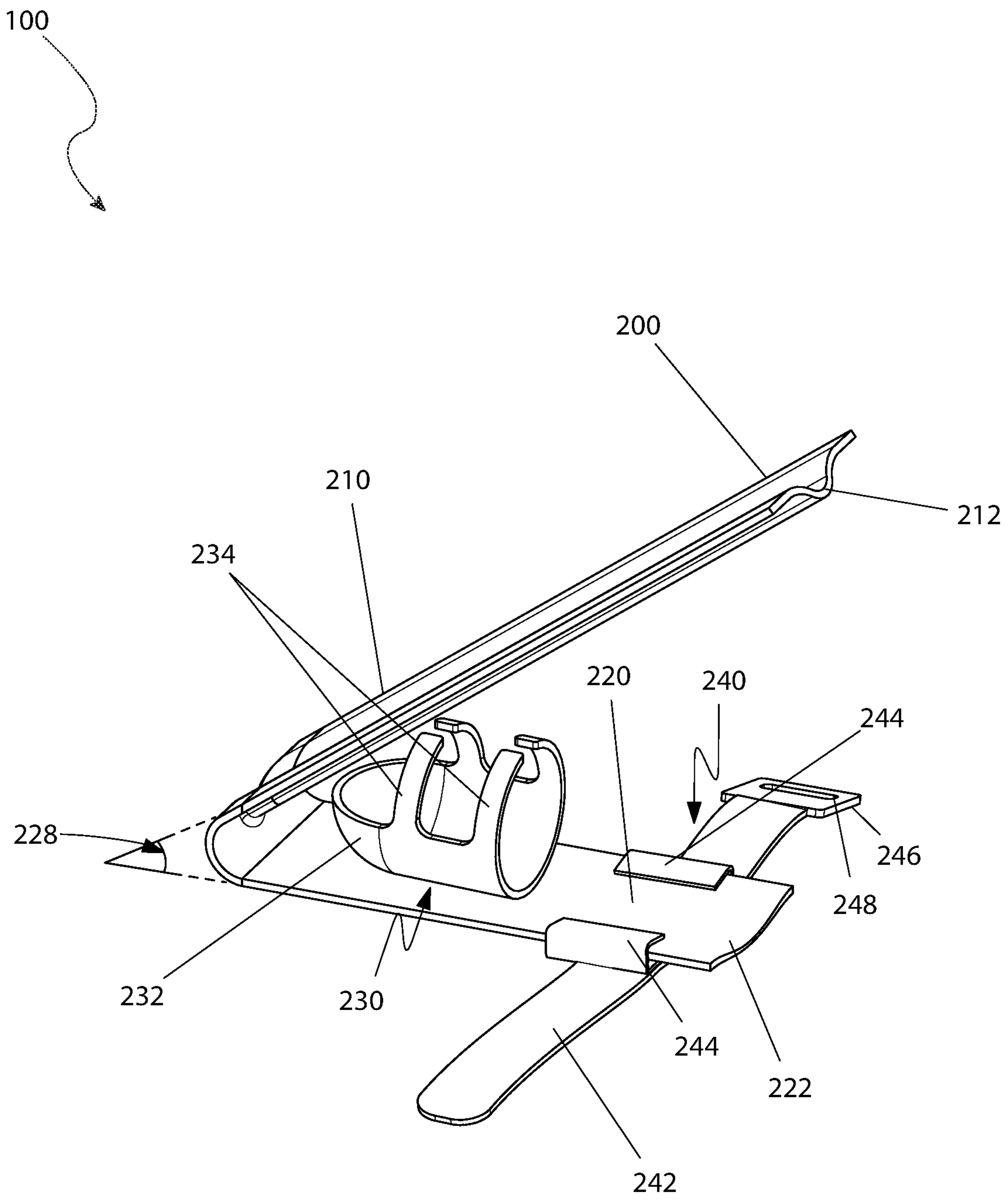
FIG. 1 is a rear isometric view of a writing implement holder 100, according to an embodiment of the present invention.
Figure 2:
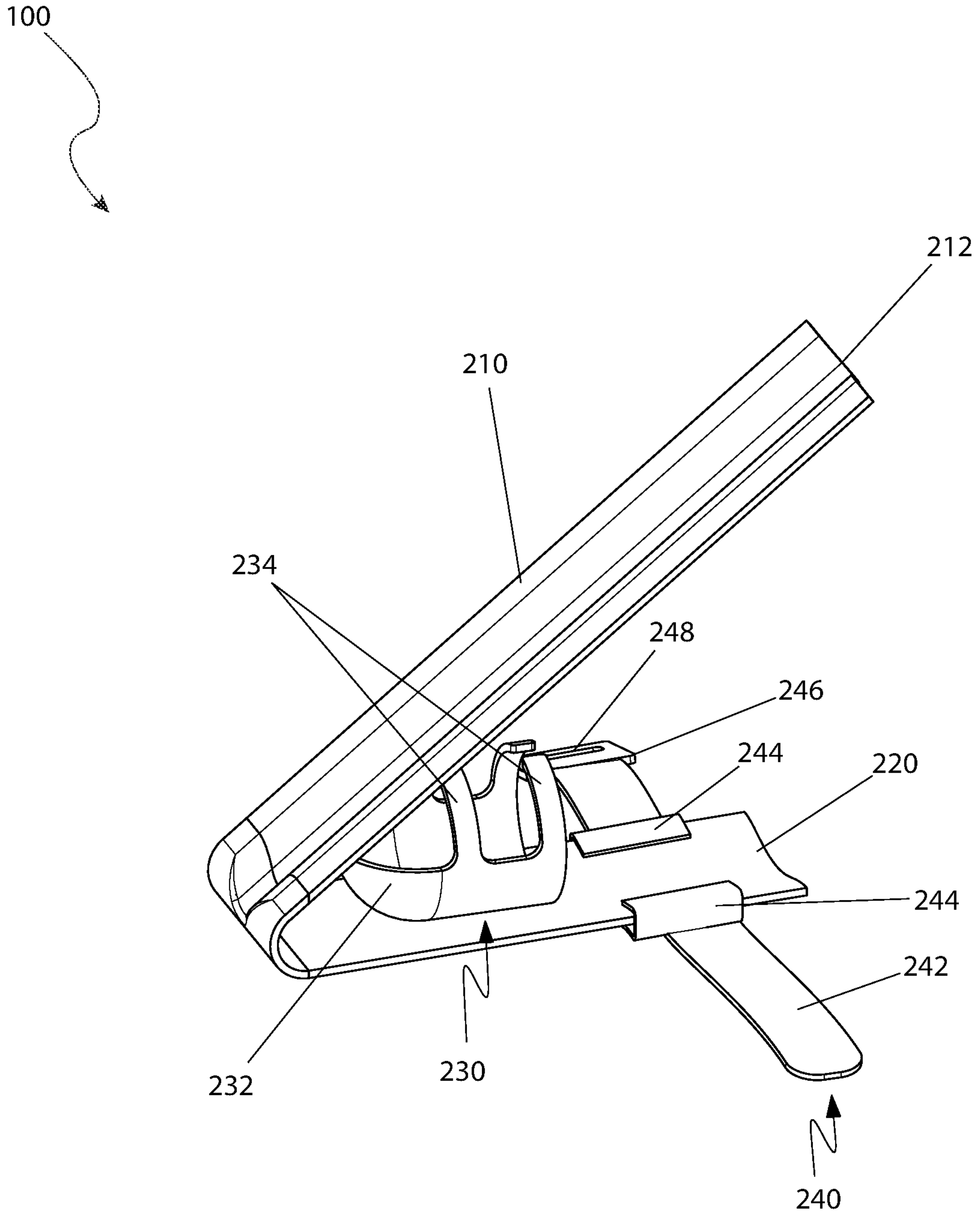
FIG. 2 is a front isometric view of a writing implement holder 100, according to an embodiment of the present invention.

100 writing implement holder
200 bent armature
210 upper arm
212 trough
220 lower arm
222 concave curvature
228 angle
230 fingertip sleeve
232 solid bottom half 234 tab
240 finger retainer
242 strap
244 capturing element
246 slotted tab
248 slot
250 implement retainer
300 extension
302 extension strap
304 extension capturing element
346 extension slotted tab
348 extension slot
900 writing implement
902 tip
904 pocket clip
920 surface
952 user's finger

DESCRIPTION OF THE INVENTION

The present invention is directed to a writing implement holder (herein described as the "invention" as disclosed in FIGS. 1-7) 100. The invention 100 may be a device that is adapted to hold a writing implement 900 on a user's finger 952 such that movement of the user's finger 952 may move a tip 902 of the writing implement 900 against a surface 920. As non-limiting examples, the invention 100 may be adapted to be worn on an index finger, the writing implement 900 may be a pen, a pencil, a marker, or a stylus, and the surface 920 may be a sheet of paper, a tablet computer, or a smartphone. The invention 100 may hold the writing implement 900 to compensate for a lack of dexterity after an injury or illness, to avoid direct contact with the surface 920, or both. As non-limiting examples, injuries and illnesses that may reduce dexterity may include a heart attack, a stroke, arthritis, multiple sclerosis, or any combination thereof.

The invention 100 may comprise a bent armature 200, a fingertip sleeve 230, a finger retainer 240, and one (1) or more implement retainers 250. A lower arm 220 of the bent armature 200 may be adapted to couple to the user's finger 952 via the fingertip sleeve 230 and the finger retainer 240. The writing implement 900 may couple to an upper arm 210 of the bent armature 200.

The upper arm 210 of the bent armature 200 and the lower arm 220 of the bent armature 200 may meet to form an angle 228 that is oblique and appropriate for writing or drawing. In a preferred embodiment, the angle 228 may be thirty-eight degrees with an error of five degrees (38.0°+/−) 5.0°. In some embodiments, the angle 228 may be adjustable. As a non-limiting example, the bent armature 200 may be bendable at the intersection of the upper arm 210 and the lower arm 220 to change the angle 228.

Figure 3:
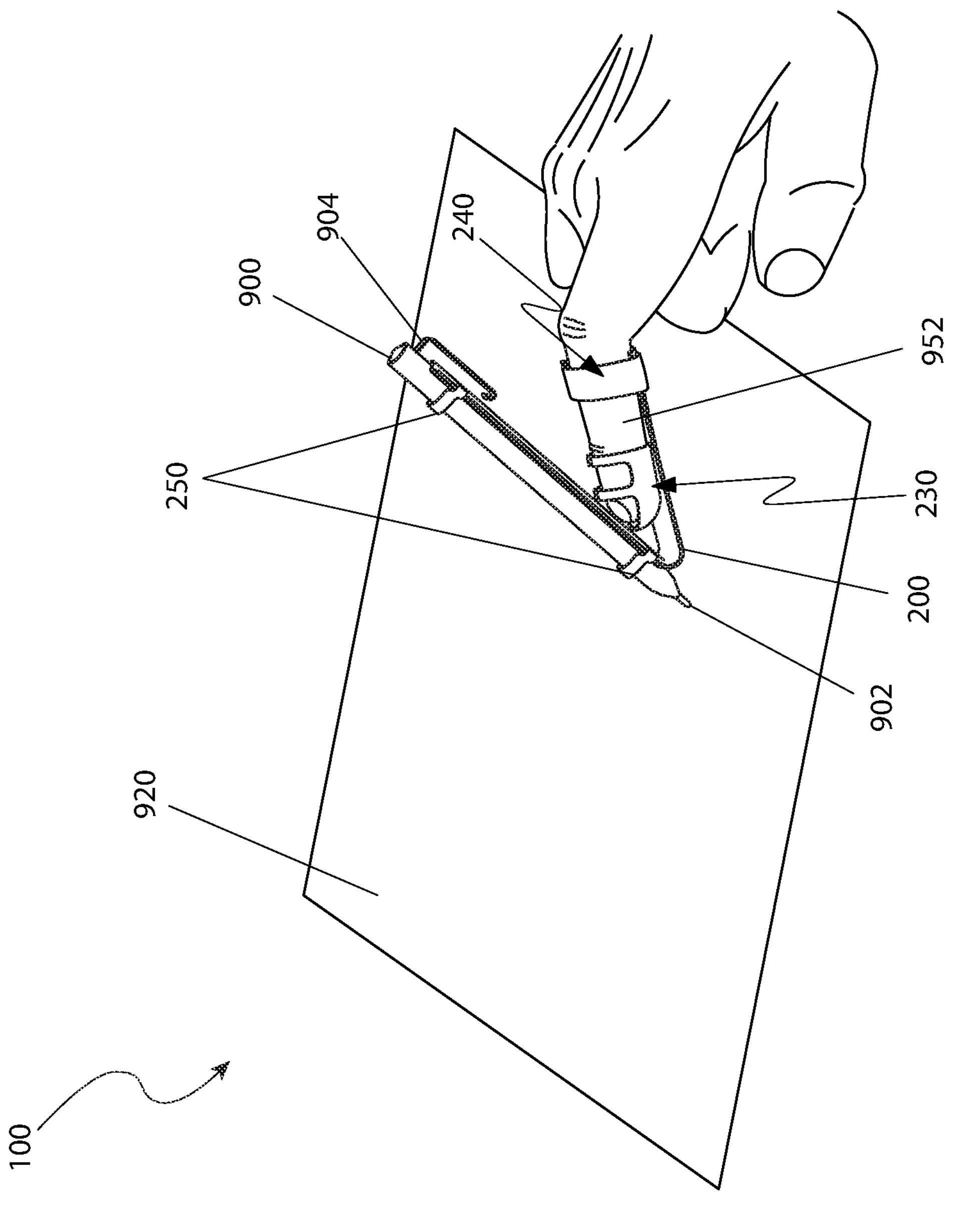
FIG. 3 is an in-use view of a writing implement holder 100, according to an embodiment of the present invention.
Figure 4:
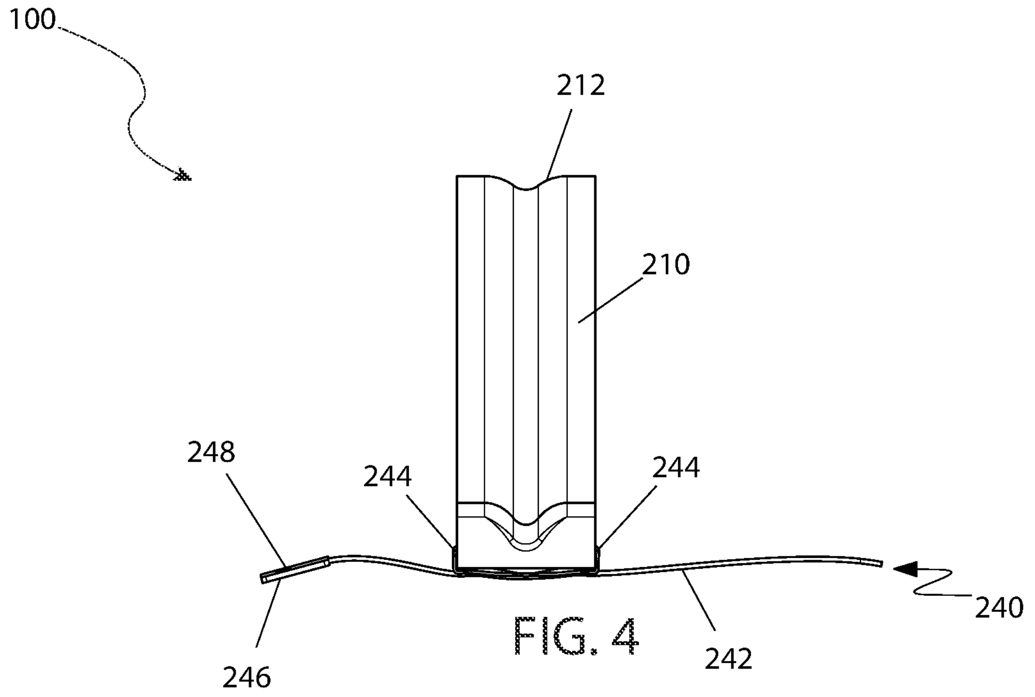
FIG. 4 is a front view of a writing implement holder 100, according to an embodiment of the present invention.
Figure 5:
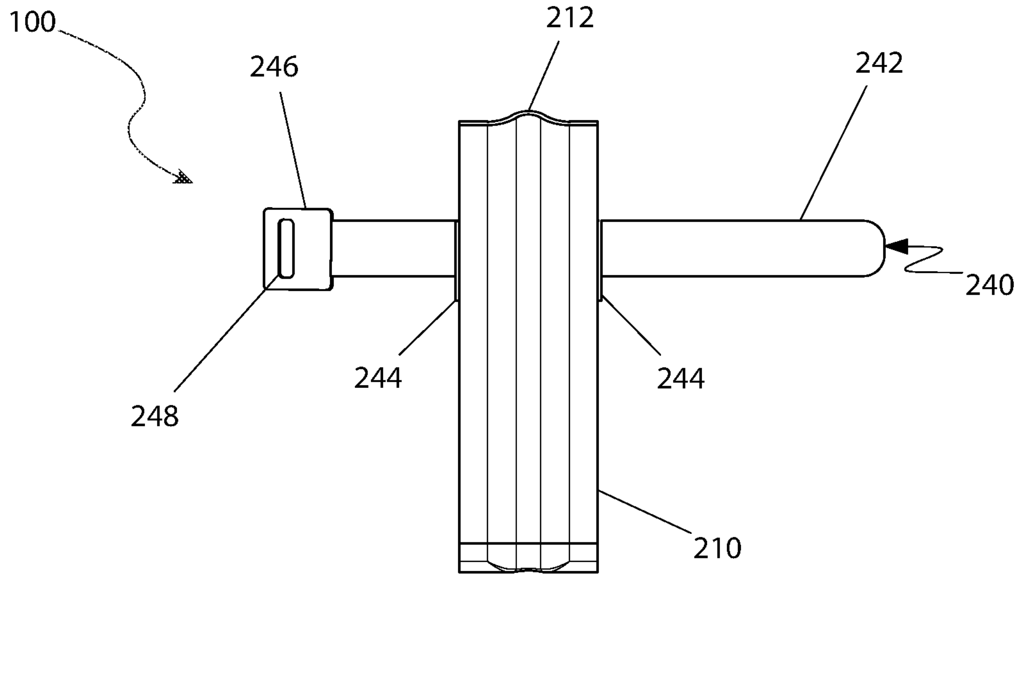
FIG. 5 is a top view of a writing implement holder 100, according to an embodiment of the present invention.
Figure 6:
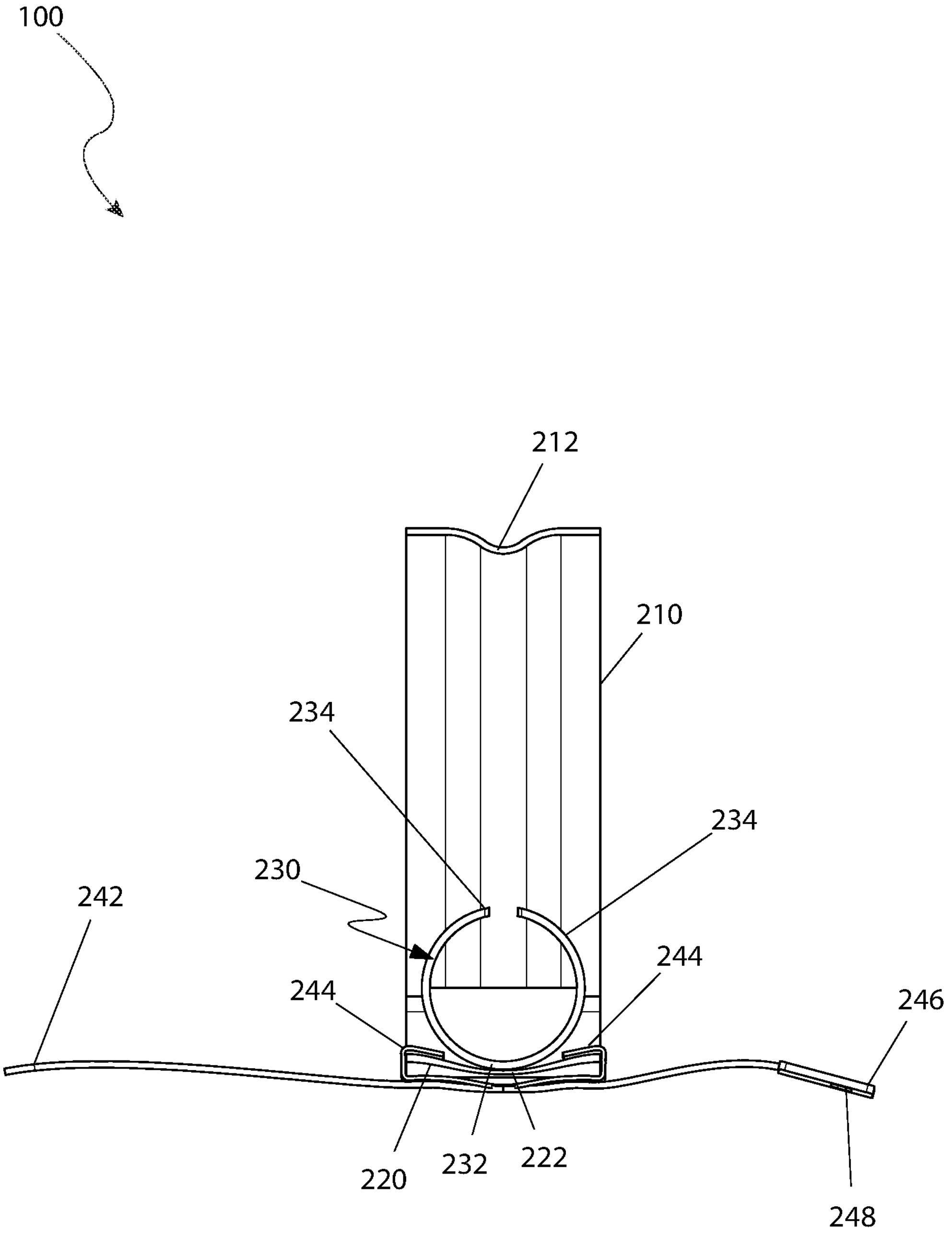
FIG. 6 is a rear view of a writing implement holder 100, according to an embodiment of the present invention; and, FIG. 7 is a rear isometric view of a writing implement holder 100, with an extension 300 removably attached thereto, according to an embodiment of the present invention.
Figure 7:
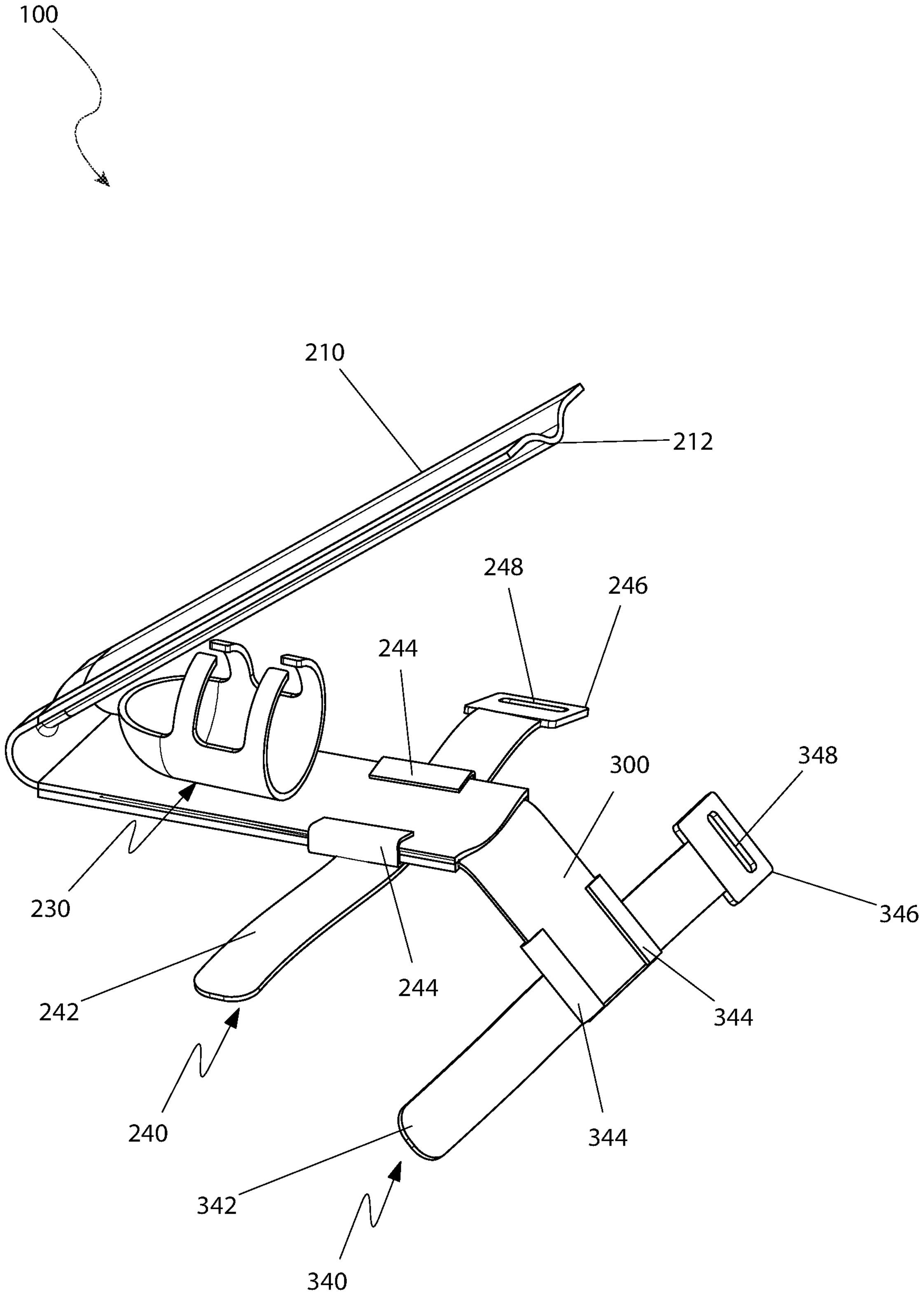

The upper arm 210 may be oriented to form the angle 228 relative to the surface 920, as seen in FIG. 3. The upper arm 210 may comprise a trough 212 that may run longitudinally along the upper arm 210. The trough 212 may project downward towards the lower arm 220 such that the writing implement 900 may be placed into the trough 212. The trough 212 may prevent the writing implement 900 from rolling off of a side of the upper arm 210. In some embodiments, the center of the trough 212 may be flattened such that a pocket clip 904 of the writing implement 900 may detachably couple to the upper arm 210 by pressing against the flattened bottom of the trough 212 from the bottom of the trough 212.

The lower arm 220 may be oriented to extend horizontally parallel to the surface 920. The lower arm 220 may comprise a concave curvature 222 that may be adapted to conform to the bottom of the user's finger 952.

The fingertip sleeve 230 may be coupled to the top of the lower arm 220. The finger retainer 240 may be adjustably connected to the lower arm 220. The fingertip sleeve 230 is positioned close to the angle 228. The finger retainer 240 shall remain adjustable along a length of the lower arm 220 and should not be restricted by the location of the fingertip sleeve 230. The fingertip sleeve 230 and the finger retainer 240 may be adapted to detachably couple to the user's finger 952.

The fingertip sleeve 230 may be hollow and may comprise an elliptical nosecone shape. The fingertip sleeve 230 may be oriented to position the tip of the elliptical nosecone shape proximal to the angle 228 of the bent armature 200. The fingertip sleeve 230 may comprise a solid bottom half 232. The top half of the fingertip sleeve 230 may be open and may comprise a plurality of tabs 234. The plurality of tabs 234 may be adapted to bend over the top of the user's finger 952. The fingertip sleeve 230 may be adapted for the tip of the user's finger 952 to slide into the fingertip sleeve 230.

The finger retainer 240 may comprise an elongate strap 242 having a first end, a second end removably attachable to the first end, and a capturing element 244 attached or integral with the upper side of the strap 242. In some embodiments, the capturing element 244 may be a similar material as the strap 242, further having upturned distal side edges capable of gripping over the perimeter edges of the lower arm 220 and configured to travel along the length thereof. The finger retainer 240 may be adapted to detachably couple to the user's finger 952 at a location that is between the palm and the fingernail. The strap 242 may be adapted to wrap around the user's finger 952. A fastening means may be adapted to retain the strap 242 on the user's finger 952.

In some embodiments, the fastening means may comprise a slotted tab 246 coupled to a first end of the strap 242. A second end of the strap 242 may pass through a slot 248 on the slotted tab 246 in order to retain the strap 242. In some embodiments, the fastening means may comprise a hook-and-loop fastener dispersed on opposing ends of the strap 242.

The one (1) or more implement retainers 250 may retain the writing implement 900 to the upper arm 210 by encircling the writing implement 900 and the upper arm 210. In some embodiments, the implement retainers 250 may be one (1) or more nylon cable ties comprising teeth on a first end of an individual nylon cable tie that may engage a pawl in the head of a second end of the individual nylon cable tie. In some embodiments, the implement retainers 250 may be one (1) or more hook-and-loop cable ties comprising a hook surface on a first end of an individual hook-and-loop cable tie that may engage a loop surface on a second end of the individual hook-and-loop cable tie.

In a preferred embodiment, the length of the upper arm 210 may be five inches with an error of one-half inch (5.0+/−0.5 in.). and the length of the lower arm 220 may be two and one-half inches with an error of one-half inch (2.5+/−0.5 in.).

In use, a user or caregiver may couple a writing implement 900 to the upper arm 210 by placing the writing implement 900 into the trough 212 with the tip of the writing implement 900 pointing down and extending in front of the upper arm 210. If the writing implement 900 comprises a pocket clip 904, the pocket clip 904 may be coupled to the top of the upper arm 210. The writing implement 900 may be secured in place using the implement retainers 250. The user may detachably couple the invention 100 to a user's finger 952 by sliding the tip of the user's finger 952 into the fingertip sleeve 230 and securing the lower arm 220 to the user's finger 952 with the finger retainer 240. The user may place the tip of the writing implement 900 against a surface 920 and may move the user's finger 952 to interact with the surface 920 via the writing implement 900.

In some embodiments, an extension 300 is attached to or integral with the lower arm 220 and may be seen as an angled extension thereof, being coextensive in width and thickness. The extension 300 may be oriented along the same linear direction as the lower arm 220 or be directed at an angle above or below thereof. The extension 300 may be partially or fully flexible.

An extension strap 342 includes a first end, a second end removably attachable to the first end, and an extension capturing element 344 attached or integral with the upper side of the extension strap 342. In some embodiments, the extension capturing element 344 may be a similar material as the extension strap 342, further having upturned distal side edges capable of gripping over the perimeter edges of the extension 300 and configured to travel along the length thereof. The extension strap 340 may be adapted to detachably couple to the user's finger 952 at another location thereon. The extension strap 342 may be adapted to wrap around the user's finger 952. A fastening means may be adapted to retain the extension strap 342 on the user's finger 952.

In some embodiments, the fastening means may comprise an extension slotted tab 346 coupled to a first end of the extension strap 342. A second end of the extension strap 342 may pass through an extension slot 348 on the extension slotted tab 346 in order to retain the extension strap 342. In some embodiments, the fastening means may comprise a hook-and-loop fastener dispersed on opposing ends of the extension strap 342.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A writing implement holder comprising:

a bent armature;

a fingertip sleeve secured upon an inside face of the bent armature;

a finger retainer secured upon the inside face of the bent armature adjacent a bent armature first end; and, one or more implement retainers; and, wherein the bent armature comprises an upper arm and a lower arm meeting at an oblique angle appropriate for writing or drawing;

wherein the angle formed by the upper arm and the lower arm is thirty-eight degrees with an error of five degrees; and, wherein the angle formed by the upper arm and the lower arm is adjustable.

2. The writing implement holder of claim 1, wherein the upper arm of the bent armature comprises a trough on an exterior face of the upper arm of the bent armature for holding a writing implement and preventing the writing implement from rolling off.

3. The writing implement holder of claim 1, wherein the lower arm of the bent armature has a concave curvature conforming to a bottom of a user's finger.

4. The writing implement holder of claim 1, wherein the fingertip sleeve is hollow and has an elliptical nosecone shape.

5. The writing implement holder of claim 4, wherein the fingertip sleeve comprises a solid bottom half and a top half with a plurality of tabs for bending over a user's finger.

6. The writing implement holder of claim 1, wherein the finger retainer comprises an elongate strap with a capturing element for detachably coupling to a user's finger.

7. The writing implement holder of claim 6, wherein the finger retainer is adjustable along a length of the lower arm.

8. The writing implement holder of claim 6, wherein a fastening means for retaining the strap on the user's finger comprises a slotted tab or a hook-and-loop fastener.

9. The writing implement holder of claim 1, wherein the one or more implement retainers encircle a writing implement and the upper arm of the bent armature.

10. The writing implement holder of claim 9, wherein the one or more implement retainers are nylon cable ties or hook-and-loop cable ties.

11. The writing implement holder of claim 1, wherein a length of the upper arm is five inches with an error of one-half inch.

12. The writing implement holder of claim 1, wherein a length of the lower arm is two and one-half inches with an error of one-half inch.

13. The writing implement holder of claim 1, further comprising an extension attached to or integral with the lower arm.

14. The writing implement holder of claim 13, wherein the extension is partially or fully flexible.

15. The writing implement holder of claim 13, further comprising an extension strap with a capturing element for detachably coupling to a user's finger at a different location on the user's finger from an original location.

16. The writing implement holder of claim 15, wherein a fastening means for retaining the extension strap on the user's finger comprises an extension slotted tab or a hook-and-loop fastener.

17. The writing implement holder of claim 1, adapted for use by individuals with reduced dexterity due to injuries or illnesses such as a heart attack, a stroke, arthritis, multiple sclerosis, or any combination thereof.

* * * * *